US009377098B2

(12) United States Patent
Yamamoto

(10) Patent No.: US 9,377,098 B2
(45) Date of Patent: Jun. 28, 2016

(54) POWER TRANSMISSION DEVICE AND MANUFACTURING METHOD THEREOF

(71) Applicant: SUMITOMO HEAVY INDUSTRIES, LTD., Tokyo (JP)

(72) Inventor: Akira Yamamoto, Obu (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 39 days.

(21) Appl. No.: 13/951,863

(22) Filed: Jul. 26, 2013

(65) Prior Publication Data

US 2014/0116171 A1    May 1, 2014

(30) Foreign Application Priority Data

Oct. 26, 2012   (JP) .................. 2012-237320

(51) Int. Cl.
*F16H 57/031*    (2012.01)
*F16H 57/032*    (2012.01)
*F16H 57/023*    (2012.01)
(Continued)

(52) U.S. Cl.
CPC ............ *F16H 57/031* (2013.01); *F16H 57/023* (2013.01); *F16H 57/032* (2013.01); *F16H 57/038* (2013.01); *F16H 2057/02073* (2013.01); *F16H 2057/02091* (2013.01);
(Continued)

(58) Field of Classification Search
CPC ............ F16H 2057/02073; F16H 2057/02091; F16H 2057/0325; F16H 57/038; F16H 57/032; F16H 57/037; F16H 57/021; F16H 57/031; F16H 2057/02008; F16H 2057/02017; F16H 2057/02069; F16H 2057/02086

USPC ............................ 74/606 R, 412 R, 416, 417
See application file for complete search history.

(56) References Cited

U.S. PATENT DOCUMENTS 2,604,795 A * 7/1952 Ristow ............... F16H 1/14
74/417
2,785,587 A * 3/1957 Lowe ....................... 74/650
(Continued)

FOREIGN PATENT DOCUMENTS

CN    201656679 U    11/2010
DE    102009005344 A1 *    8/2010 ............ F16H 57/02
(Continued)

OTHER PUBLICATIONS

European Search Report application No. 13020073.6 dated Oct. 28, 2014.

*Primary Examiner* — William Kelleher
*Assistant Examiner* — Bobby Rushing, Jr.
(74) *Attorney, Agent, or Firm* — Squire Patton Boggs (US) LLP

(57) ABSTRACT

A power transmission device includes a gear speed reduction mechanism which includes an input shaft, an input pinion provided on the input shaft, a rotary shaft other than the input shaft, and a gear incorporated to the rotary shaft, and a casing which accommodates the gear speed reduction mechanism. The casing is made of resin and includes a casing body which includes an incorporating opening for incorporating the gear and a cover which closes the incorporating opening. The casing body includes an input side opening with the opening being a size that the input pinion can be inserted but the gear cannot be inserted. In addition, the rotary shaft is supported by a bearing support which is formed in the casing body, and the bearing support of the rotary shaft is not formed on the cover.

6 Claims, 3 Drawing Sheets

(51) Int. Cl.
*F16H 57/038* (2012.01)
*F16H 57/02* (2012.01)

(52) U.S. Cl.
CPC .. *F16H 2057/0325* (2013.01); *Y10T 29/49464* (2015.01); *Y10T 74/19642* (2015.01)

(56) References Cited

U.S. PATENT DOCUMENTS

| | | | | |
|---|---|---|---|---|
| 3,198,036 | A | * | 8/1965 | Muller ........................ 475/246 |
| 5,287,770 | A | * | 2/1994 | Mudd .................... F16H 1/16 74/425 |
| 5,330,394 | A | * | 7/1994 | Hauser et al. .............. 475/230 |
| 5,791,204 | A | * | 8/1998 | Torii ..................... B60J 7/0573 296/223 |
| 6,648,704 | B1 | * | 11/2003 | Fontanille ..................... 440/75 |
| 8,578,817 | B2 | * | 11/2013 | Leibold ..................... 74/606 R |
| 2001/0026105 | A1 | | 10/2001 | Torii et al. |
| 2003/0155138 | A1 | | 8/2003 | Miyahara et al. |
| 2003/0183442 | A1 | * | 10/2003 | Sano et al. .................. 180/443 |
| 2007/0021558 | A1 | * | 1/2007 | Shinohara et al. ............ 525/66 |
| 2007/0044587 | A1 | * | 3/2007 | Cho ..................... F16H 57/037 74/650 |
| 2008/0264202 | A1 | * | 10/2008 | Mineshima ................ 74/606 R |
| 2010/0080498 | A1 | * | 4/2010 | Tamura et al. ............... 384/585 |
| 2010/0086248 | A1 | * | 4/2010 | Yamamoto et al. .......... 384/548 |
| 2011/0265593 | A1 | * | 11/2011 | Minegishi et al. .......... 74/412 R |
| 2012/0238390 | A1 | * | 9/2012 | Ishizuka et al. .............. 475/159 |

FOREIGN PATENT DOCUMENTS

| | | | |
|---|---|---|---|
| EP | 2 279 898 A1 | 2/2011 | |
| FR | 2 677 416 A1 | 12/1992 | |
| JP | 2971870 B1 * | 11/1999 | ............ F16H 57/029 |
| JP | 2001-346352 A | 12/2001 | |
| JP | 2003235302 * | 2/2002 | |
| JP | 2003-235302 A | 8/2003 | |
| JP | 2007327521 A * | 12/2007 | |
| JP | 2011-144904 A | 7/2011 | |

* cited by examiner

POWER TRANSMISSION DEVICE AND MANUFACTURING METHOD THEREOF

INCORPORATION BY REFERENCE

Priority is claimed on Japanese Patent Application No. 2012-237320, filed Oct. 26, 2012, the entire content of which is incorporated herein by reference.

BACKGROUND

1. Technical Field

The present invention relates to a power transmission device and a manufacturing method thereof.

2. Description of the Related Art

In the related art, a power transmission device is disclosed which includes a gear speed reduction mechanism including an input shaft, an input pinion provided on the input shaft, a rotary shaft other than the input shaft, and a gear incorporated to the rotary shaft, and a casing accommodating the gear speed reduction mechanism.

In this type of power transmission device, in the related art, a casing made of aluminum or a casing made by casting is used. Alternatively, for example, in a power transmission device or the like which is used in a food factory or the like, a casing made of stainless steel may be used.

SUMMARY

According to an embodiment of the present invention, there is a power transmission device including: a gear speed reduction mechanism which includes an input shaft, an input pinion provided on the input shaft, a rotary shaft other than the input shaft, and a gear incorporated to the rotary shaft, and a casing which accommodates the gear speed reduction mechanism. The casing is made of resin and includes a casing body which includes an incorporating opening for incorporating the gear and a cover which closes the incorporating opening. The casing body includes an input side opening with the opening being a size that the input pinion can be inserted but the gear cannot be inserted. In addition, the rotary shaft is supported by a bearing support which is formed in the casing body, and the bearing support of the rotary shaft is not formed on the cover.

According to another embodiment of the present invention, there is provided a manufacturing method of a power transmission device which includes a gear speed reduction mechanism including an input shaft, an input pinion provided on the input shaft, a rotary shaft other than the input shaft, and a gear incorporated to the rotary shaft, and a casing made of resin accommodating the gear speed reduction mechanism. The manufacturing method includes: preparing a casing body which includes an input side opening through which the input pinion is inserted, an incorporating opening to which the gear is incorporated, and a bearing support which supports the rotary shaft, and a cover which closes the incorporating opening, as the casing; putting the gear from the incorporating opening into the casing body and positioning the gear to an opening of the bearing support formed in the casing body; inserting the rotary shaft from the opening of the bearing support, and assembling the gear, which is positioned to the opening of the bearing support in advance, to the inserted rotary shaft; disposing the bearing between the rotary shaft and the opening of the bearing support, and bearing-supporting the rotary shaft in the casing body; closing the incorporating opening by the cover; and inserting the input pinion into the input side opening, and engaging the input pinion with the gear which is incorporated in advance.

DETAILED DESCRIPTION

In the related art, in the power transmission device which adopts the casing made of metal, there are problems in that the overall weight becomes heavy and the costs are increased, and the problems cannot be avoided.

In terms of the weight and costs, a "resin" is taken into consideration as a material of the casing instead of the metal. However, when the casing made of metal is simply replaced by the casing made of resin, a decrease in strength or rigidity cannot be avoided.

It is desirable to provide a power transmission device capable of suppressing a decrease in strength or rigidity as much as possible while adopting a casing made of resin having a reduction in weight and low costs, and a manufacturing method thereof.

In the embodiment of the present invention, the casing is configured of the casing body which includes the incorporating opening to which the gear (other than the input pinion) is incorporated, and the cover which closes the incorporating opening. The input pinion is incorporated into the casing from the input side opening which is separately formed in the casing body. The size of the input side opening is set to a size that the input pinion can be inserted but the gear cannot be inserted.

Moreover, the rotary shaft is configured to be supported by the bearing support, and the bearing support is formed only on the casing body and is not formed on the cover.

Accordingly, the size of the opening portion of the casing can be further decreased, and thus, rigidity of the casing body can be further increased. Moreover, since the bearing support which supports the rotary shaft is formed in the casing body having high rigidity, the rotary shaft can be rotated in a considerably stable state.

According to certain embodiments of the present invention, a power transmission device capable of suppressing a decrease in strength or rigidity as much as possible while adopting a casing made of resin having a reduction in weight and low costs, and a manufacturing method thereof can be obtained.

Hereinafter, an example of an embodiment of a power transmission device according to an embodiment of the present invention will be described in detail with reference to drawings.

FIGS. 1 to 3D show a speed reduction device G1 (power transmission device) according to an example of an embodiment of the present invention in various directions and cross-sections.

Figure 2:
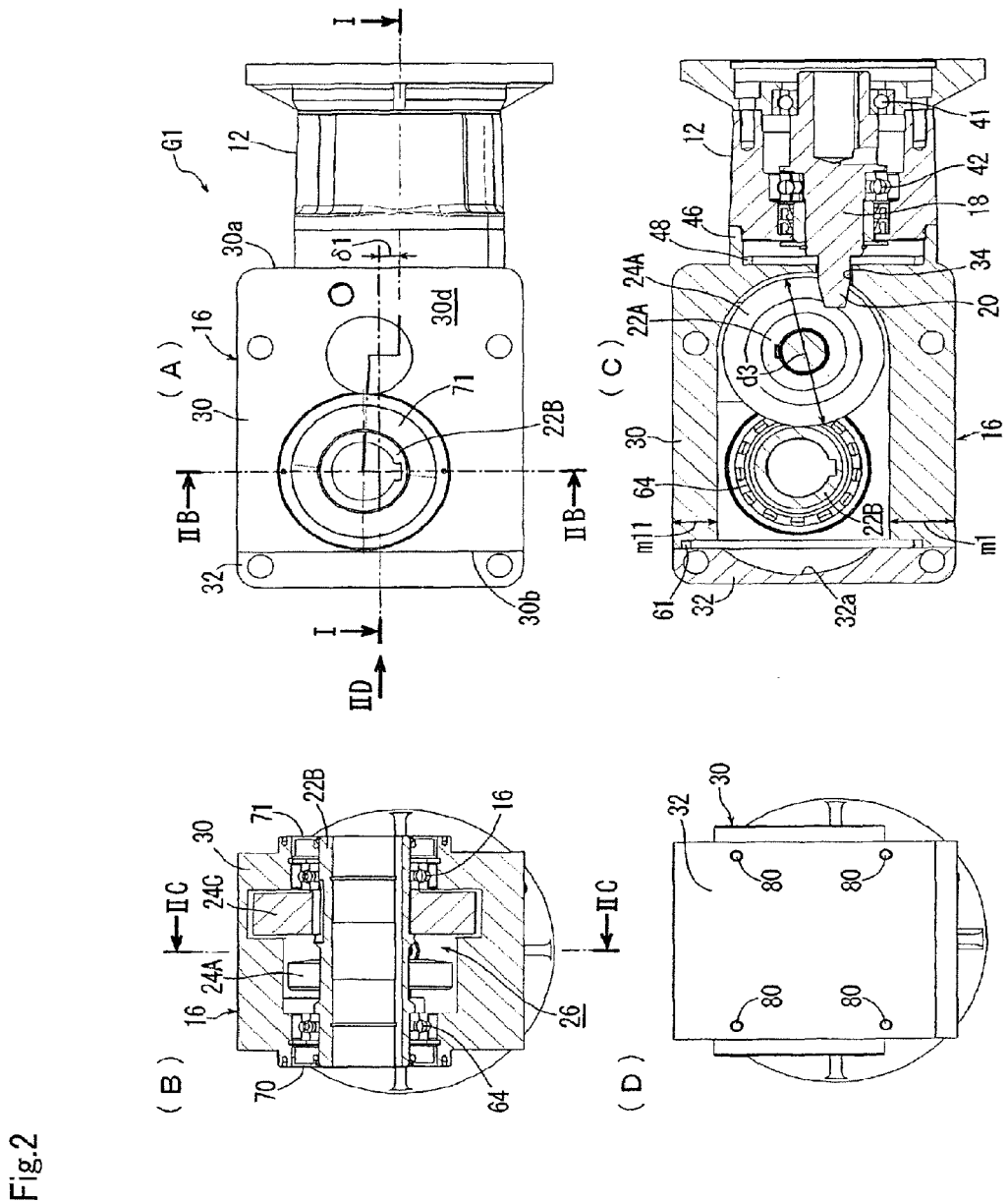
FIG. 2A is a front view of the power transmission device of FIG. 1.
FIG. 2B is a cross-sectional view taken along an arrow IIB-IIB of FIG. 2A.
FIG. 2C is a cross-sectional view taken along an arrow IIC-IIC of FIG. 2B.
FIG. 2D is a side view when viewed in an arrow IID direction of FIG. 2A.
Figure 3:
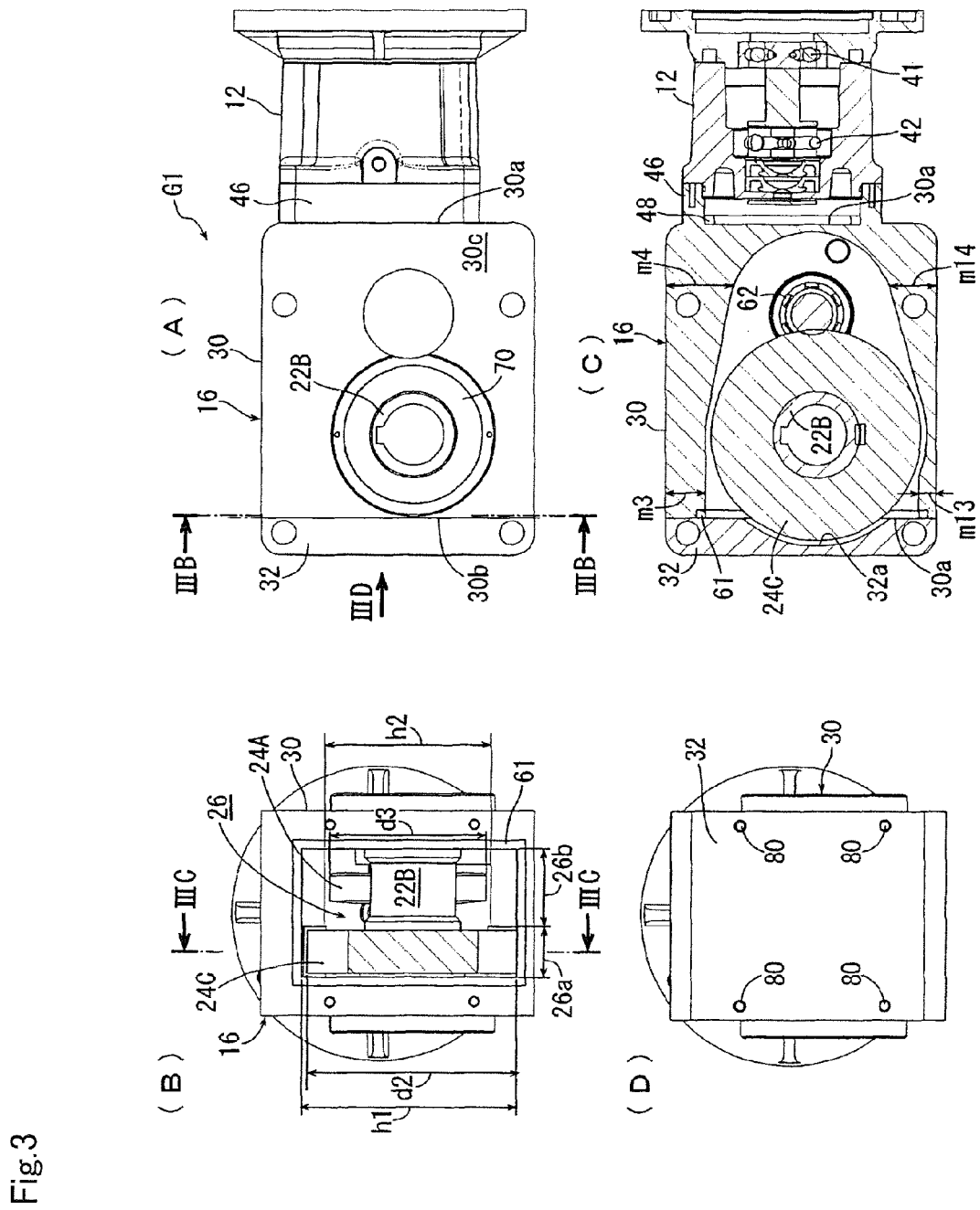
FIG. 3A is a rear view in which a motor side of FIG. 3A is maintained in the same direction as FIG. 2A in the power transmission device of FIG. 1.
FIG. 3B is a cross-sectional view taken along an arrow IIIB-IIIB of FIG. 3A.
FIG. 3C is a cross-sectional view taken along an arrow IIIC-IIIC of FIG. 3B.
FIG. 3D is a side view when viewed in an arrow IIID direction of FIG. 3A.

Moreover, FIG. 3A is not a rear view when viewed from a rear surface in a state where up and down directions are maintained with respect to FIG. 2 but a rear view (reversed in the up and down directions) when viewed from a rear surface in a state where left and right directions are maintained with respect to FIG. 2.

When the speed reduction device G1 is schematically described, the speed reduction device G1 is used to be connected via a motor (not shown) and a splice casing 12.

The speed reduction device G1 includes a gear speed reduction mechanism 14 and a casing 16 which accommodates the gear speed reduction mechanism 14.

The gear speed reduction mechanism 14 includes an input shaft 18, a hypoid pinion 20 (input pinion) provided on the input shaft 18, an intermediate shaft 22A and an output shaft 22B which are rotary shafts 22 other than the input shaft 18, and a hypoid gear 24A (orthogonal gear), an intermediate gear 24B, and an output gear 24C which are gears 24 (other than the input pinion) which are incorporated in the rotary shaft 22.

The casing 16 is made of a resin. The casing 16 includes a casing body 30, which includes an incorporating opening 26 for incorporating the gear 24 (hypoid gear 24A, intermediate gear 24B, and output gear 24C), and a cover 32 which closes the incorporating opening 26.

The casing body 30 further includes an input side opening 34 with the opening being a size that the hypoid pinion 20 (input pinion) can be inserted but the gear 24 (hypoid gear 24A, intermediate gear 24B, and output gear 24C) cannot be inserted. The rotary shaft 22 (intermediate shaft 22A and output shaft 22B) is supported by first bearing supports 36 and 37 and second bearing supports 38 and 39 which are formed in the casing body 30. However, the bearing supports of the rotary shaft 22 are not formed on the cover 32.

Hereinafter, the speed reduction device will be sequentially described in detail.

The splice casing 12 (an input shaft support member which is also used as a motor connection member) is provided between the motor and the speed reduction device G1. The input shaft 18 of the speed reduction device G1 is supported to the splice casing 12 via bearings 41 and 42. In a state where the input shaft 18 is supported to the splice casing 12, the input shaft 18 is inserted into the casing 16 from the input side opening 34 of the casing 16 of the speed reduction device G1. Moreover, the splice casing 12 may not be necessary. For example, a motor shaft of the motor is also used as the input shaft of the speed reduction device, an input pinion is formed on the tip of the motor shaft, and the input pinion of the tip of the motor shaft may be inserted into the casing of the speed reduction device. Alternatively, for example, when the input side opening of the speed reduction device has some axial length, the input shaft may be supported by a bearing which is disposed in the input side opening. Moreover, also in this case, the input side opening has the size which does not allow the insertion of the gears other than the input shaft.

The hypoid pinion 20 (input pinion) is formed on the input shaft 18. The hypoid pinion 20 is engaged with the hypoid gear 24A which is incorporated to the intermediate shaft 22A. The intermediate gear 24B is formed on the intermediate shaft 22A in a direct cut manner. The intermediate gear 24B is engaged with the output gear 24C which is incorporated to the output shaft 22B. In this embodiment, all power transmission members (input shaft 18, hypoid pinion 20, rotary shaft 22, and gear 24) other than the casing 16 are formed of metal. That is, in a power transmission system, the configuration and the material are similar as those of the related art.

As described above, the casing 16 of the speed reduction device G1 according to the present embodiment is configured of the casing body 30 and the cover 32. First, a configuration of the casing body 30 will be described in detail.

The overall shape of the casing body 30 is an approximately rectangular parallelepiped shape, and the casing body includes the input side opening 34, the incorporating opening 26, the first bearing supports 36 and 37, and the second bearing supports 38 and 39.

The input side opening 34 of the casing body 30 has the size that the hypoid pinion 20 can be inserted but the gear 24 (hypoid gear 24A, intermediate gear 24B, and output gear 24C) cannot be inserted, that is, has a minimum size required to insert the hypoid pinion 20. The hypoid pinion 20 is inserted into the casing body 30 from the input side opening 34 and is engaged with the hypoid gear 24A in the casing body 30. Since the hypoid pinion 20 is engaged with the hypoid gear 24A in a state where the rotary shaft center of the hypoid pinion is offset from that of the hypoid gear in not only an axial direction but also a radial direction, the input side opening 34 is formed at a position which is offset by δ1 from a center of a side surface of the casing body 30.

In the present embodiment, a quadrilateral tubular portion 46 for connecting the splice casing 12 is formed to be protruded on a surface 30a (a surface of an input side of the casing body 30) on which the input side opening 34 is formed. A ring-like stiffened member 48 made of metal is positioned on a corner of an inner circumference of the tubular portion 46. Accordingly, strength and rigidity of the surface 30a, on which the input side opening 34 of the casing body 30 is formed, are increased.

The incorporating opening 26 of the casing body 30 is formed on a surface 30b of a side opposite to the motor. That is, the input side opening 34 and the incorporating opening 26 are provided on opposite surfaces 30a and 30b of the casing body 30 respectively. Since the size of the gear 24 (hypoid gear 24A, intermediate gear 24B, and output gear 24C) other than the hypoid pinion 20 is larger than that of the input side opening 34, all the gears are incorporated to the incorporating opening 26.

As shown in FIG. 3B, the incorporating opening 26 is not a simple quadrilateral in shape, and includes a portion 26a in which an opening height (an opening width in a direction perpendicular to the output shaft 22B) h1 is larger than an outer diameter d2 of the output gear 24C incorporated to the output shaft 22B and a portion 26b in which an opening height h2 is smaller than the outer diameter d2. Here, the opening height of the incorporating opening 26 means a size in a direction perpendicular to the axial direction of the output shaft 22B of the incorporating opening 26. In other words, the incorporating opening 26 includes the portion 26a in which the opening height h1 is larger than the outer diameter d2 of the output gear 24C and the output shaft 22B can be incorporated, and the portion 26b in which the opening height h2 is smaller than the outer diameter d2 of the output gear 24C and the output shaft 22B cannot be incorporated.

In addition, in this embodiment, a closed quadrilateral (ring-like) stiffened member 61 made of metal is also disposed around the incorporating opening 26, and thus, strength and rigidity in the vicinity of the incorporating opening 26 of the casing body 30 are further increased. Specifically, a recess is formed in the inner side of the incorporating opening 26 of the casing body 30, and the stiffened member 61 is disposed in the recess and is interposed between the cover 32 and the recess.

Returning to FIG. 1, the casing body 30 further includes the first bearing supports 36 and 37 for supporting the intermediate shaft 22A and the second bearing supports 38 and 39 which support the output shaft 22B. As is obvious from FIGS. 2 and 3, the first bearing supports 36 and 37 and the second bearing supports 38 and 39 are formed on surfaces 30c and 30d which intersect (perpendicular in this example) the surfaces 30a and 30b (opposite surfaces of the casing body 30) on which the input side opening 34 and the incorporating opening 26 are provided.

First openings 50 and 51 (specifically, first inner openings 50A and 51A and first outer openings 50B and 51B) are formed on the first bearing supports 36 and 37 which support the intermediate shaft 22A. The inner diameter of the first opening 50 of the first bearing support 36 close to the hypoid gear 24A is D4, and the inner diameter of the first opening 51 of the first bearing support 37 far from the hypoid gear 24A is D5 which is smaller than D4 (D4>D5). First bearings 60 and 62 are disposed in the first inner openings 50A and 51A respectively. First retaining rings 52 and 53 are fit to ends in the radial direction of the first inner openings 50A and 51A and lock the first bearings 60 and 62. Caps 54 and 55 are covered on the first outer openings 50B and 51B respectively. In the first openings 50 and 51 of the first bearing supports 36 and 37, since the smaller first opening 51 is also larger than a maximum outer diameter d6 of the intermediate shaft 22A, the intermediate shaft 22A can be incorporated into the casing 16 from the first opening 50 of the first bearing support 36 (close to the hypoid gear 24A) or the first opening 51 of the opposite first bearing support 37 from the outside of the casing body 30.

Figure 1:
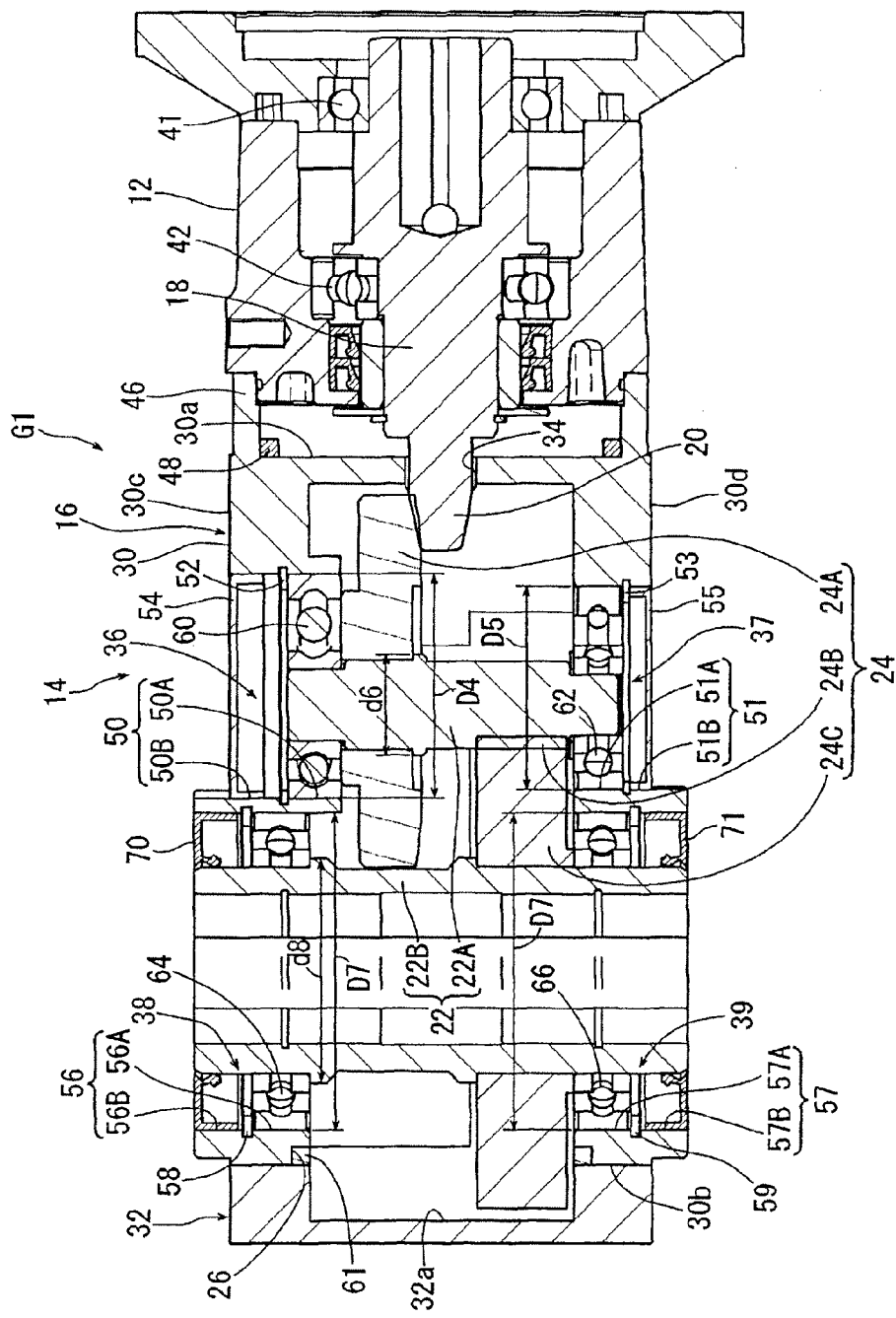
FIG. 1 is an enlarged cross-sectional view including partially developed cross-sections taken along an arrow I-I of FIG. 2A of a power transmission device showing an example of an embodiment of the present invention.

Moreover, in the first bearings 60 and 62, the reason why the left and the right of the intermediate shaft 22A are different from each other on the paper surface of FIG. 1 is because the right side on the paper surface is shown in a developed cross-section. The first bearings 60 and 62 may be the same as each other, and on the contrary to the embodiment, D4<D5 may be satisfied.

The second bearing supports 38 and 39 which support the output shaft 22B also includes an approximately similar configuration to the first bearing supports 36 and 37. That is, also in the second bearing supports 38 and 39, second openings 56 and 57 (second inner openings 56A and 57A and second outer rings 56B and 57B) are formed. The second openings 56 and 57 of the second bearing supports 38 and 39 include an inner diameter D7 which is the same as the both ends of the output shaft 22B. Output shaft bearings 64 and 66 are fitted to the second inner openings 56A and 57A. Second retaining rings 58 and 59 are fitted to the ends in the radial direction of the second inner openings 56A and 57A and lock the output shaft bearings 64 and 66. Unlike the intermediate shaft 22A, since the output shaft 22B protrudes outside the casing body 30, oil seals 70 and 71 are disposed on the second outer rings 56B and 57B. Accordingly, sealing between the output shaft 22B and the casing body 30 is performed. Also in the second bearing supports 38 and 39, since the inner diameter D7 of the second openings 56 and 57 is larger than a maximum outer diameter d8 of the output shaft 22B, the output shaft 22B can be incorporated into the casing 16 from the second opening 56 of the second bearing support 38 (close to the output gear 24C) or the second opening 57 of the opposite second bearing support 39 from the outside of the casing body 30.

An internal shape of the casing body 30 will be described. As is obvious from the comparison between cross-sections of FIG. 2C and FIG. 3C, in this embodiment, the thickness of the casing body 30 at the surface perpendicular to the output shaft 22B is not the same at each position (position of FIG. 2C and position of FIG. 3C) in the axial direction.

That is, for example, in the cross-section of the center in the axial direction (cross-section of FIG. 2C: position separated from the output gear 24C), the same thicknesses m1 and m11 are maintained from the incorporating opening 26, and the thickness is thickened to correspond to the outer diameter d3 of the hypoid gear 24A only at the motor side. Moreover, in the cross-section of FIG. 2C, that is, in the cross-section perpendicular to the output shaft 22B, the thickness m1 of the casing body 30 of the side (the lower side in FIG. 2A to 2D), to which the input shaft 18 (or the splice casing 12 which supports the input shaft 18) is shifted (by the δ1) from the center of the casing 16 in the axial direction of the output shaft 22B, is formed to be thicker than the thickness m11 of the counter-shift side.

Moreover, in the cross-section of the position (position of FIG. 3C) in the axial direction in which the output gear 24C exists, thicknesses m3 and m13 of the casing body 30 are thinnest in the vicinity of the output gear 24C close to the incorporating opening 26, and the casing body 30 is gradually (linearly) thickened from the vicinity of the output gear 24C to thicknesses m4 and m14, is further thickened so as to correspond the outer diameter d3 of the hypoid gear 24A in the vicinity of the bearing of the intermediate shaft 22A, and finally, is integrated with the side surface 30a of the input side. In addition, also in the cross-section perpendicular to the output shaft 22B at the position of FIG. 3C, the thicknesses m3 and m4 of the side (the upper side in FIG. 3A to 3D), to which the input shaft 18 (or the splice casing 12 which supports the input shaft 18) is shifted (by the δ1) from the center of the casing 16 in the axial direction of the output shaft 22B, are formed to be thicker than the thicknesses m13 and m14 of the counter-shift side.

Meanwhile, the cover 32 of the casing 16 which closes the incorporating opening 26 is quadrilateral which is the same shape as the side surface shape of the casing body 30. In this embodiment, the cover 32 is fixed to the side surface 30b of the side opposite to the motor of the casing body 30 by four bolts 80 (refer to FIGS. 2D and 3D), and thus, the incorporating opening 26 is closed. As described above, the bearing support which supports the rotary shaft 22 is not provided on the cover 32. That is, the cover 32 closes the incorporating opening 26, and thus, a closed space, in which lubricant is enclosed in the casing body 30, is formed, and the periphery of the incorporating opening 26 of the side surface 30b of the casing body 30 is stiffened so as not to be deformed.

Moreover, a recess 32a is formed in the cover 32, and thus, a portion of the output gear 24C enters the recess 32a (refer to FIGS. 1 and 3C).

Next, an operation of the speed reduction device G1 will be described along with manufacturing processes of the speed reduction device G1.

In order to manufacture the speed reduction device G1 according to the present embodiment, first, the casing body 30 and the cover 32 which configure the casing 16 are prepared. As described above, the input side opening 34, the incorporating opening 26 to which the gear 24 is incorporated, and the first bearing supports 36 and 37 and the second bearing supports 38 and 39 which support the rotary shaft 22 are formed in the casing body 30.

Sequentially, the hypoid gear 24A is put into the casing body 30 from the incorporating opening 26, and performs positioning with the first opening 50 (first inner opening 50A and first outer opening 50B) of the first bearing support 36 formed in the casing body 30 (also possible in the first bearing support 37 side).

Thereafter, the intermediate shaft 22A (to which the intermediate gear 24B is integrally formed) is inserted from the first opening 50 of the first bearing support 36, and the hypoid gear 24A, which is positioned to the first opening 50 in advance, is assembled to the inserted intermediate shaft 22A (also possible from the first bearing support 37 side).

Moreover, the first bearings 60 and 62 are disposed between the intermediate shaft 22A and the first inner openings 50A and 51A of the first bearing supports 36 and 37, and the intermediate shaft 22A is bearing-supported in the casing body 30. In addition, the first retaining rings 52 and 53 are fitted, and the caps 54 and 55 are covered on the first outer openings 50B and 51B.

Sequentially, by the same method as described above, the output gear 24C and the output shaft 22B are assembled. That is, first, the output gear 24C is put into the casing body 30 from the portion 26a in which the opening height h1 of the incorporating opening 26 is formed to be larger than the outer diameter d2 of the output gear 24C, and performs the positioning with the second opening 57 of the second bearing support 39 formed in the casing 16 (also possible in the second bearing support 38 side). Sequentially, the output shaft 22B is inserted from the second opening 57 of the second bearing support 39, and the output gear 24C, which is positioned to the second opening 57 in advance, is assembled to the inserted output shaft 22B (also possible from the second bearing support 38 side). Moreover, the output shaft bearings 64 and 66 are disposed between the output shaft 22B and the second inner openings 56A and 57A of the second openings 56 and 57, and the output shaft 22B is bearing-supported in the casing body 30. In addition, the second retaining rings 58 and 59 are fitted, and the oil seals 70 and 71 are covered on the second outer opening 56B and 57B.

Thereafter, the cover 32 is covered on the incorporating opening 26 and is closed by bolts 80, and finally, the hypoid pinion 20 supported to the splice casing 12 is inserted into the input side opening 34 and is engaged with the hypoid gear 24A which is incorporated in advance. Moreover, the insertion of the hypoid pinion 20 and the engagement between the hypoid pinion and the hypoid gear 24 may be performed before or after the incorporation of the hypoid gear 24A.

By using the above-described manufacturing method, the hypoid pinion 20 is inserted from the input side opening 34, the gear 24 (hypoid gear 24A and output gear 24C) is incorporated from the incorporating opening 26, and the rotary shaft 22 (intermediate shaft 22A and output shaft 22B) can be incorporated from the first openings 50 and 51 of the first bearing supports 36 and 37 and the second openings 56 and 57 of the second bearing supports 38 and 39.

Since the input side opening 34 is the opening having the minimum size through which the hypoid pinion 20 can be inserted and the first bearing supports 36 and 37 and the second bearing supports 38 and 39 are formed only on the casing body 30 side in which rigidity is easily secured, the intermediate shaft 22A and the output shaft 22B can be supported with high strength and rigidity, and rotation can be stably maintained.

Particularly, in the present embodiment, the input pinion is the hypoid pinion 20 (orthogonal pinion), the input side opening 34 and the incorporating opening 26 are provided on the opposite surfaces 30a and 30b of the casing body 30 respectively, and the first bearing supports 36 and 37 and the second bearing supports 38 and 39 are formed on the surfaces 30c and 30d which intersect (perpendicular in this example) the surfaces 30a and 30b on which the input side opening 34 and the incorporating opening 26 are provided. Accordingly, since the plurality of openings are not lined up on the same surface, strength or rigidity of the casing body 30 can be highly maintained.

Moreover, since the stiffened member 61 made of metal is disposed in the incorporating opening 26, although the relatively large incorporating opening 26 is formed, strength or rigidity in the vicinity of the incorporating opening 26 can be highly maintained.

Similarly, the tubular portion 46 for connecting the splice casing 12 is formed in the input side of the casing body 30, and the stiffened member 48 made of metal is disposed in the inner circumference of the tubular portion 46. In the present embodiment, since the orthogonal engagement mechanism, in which the hypoid pinion 20 and the hypoid gear 24A are engaged with each other at shaft centers offset to each other, is adopted in the input side of the gear speed reduction mechanism 14, support rigidity of the hypoid pinion 20 and the hypoid gear 24A is needed to be highly maintained. However, due to a synergistic effect of existence of the tubular portion 46 and the existence of the stiffened member 48 made of metal, strength and rigidity of the input side can be highly maintained.

In addition, since the incorporating opening 26 includes the portion 26a in which the opening height h1 is larger than the outer diameter d2 of the output gear 24C incorporated to the output shaft 22B and the portion 26b in which the opening height h2 is smaller than the outer diameter d2, the overall opening area of the incorporating opening 26 can be maintained to be smaller while the output gear 24C can be incorporated. Therefore, with the decrease of the opening area, strength and rigidity of the casing body 30, particularly, the strength and the rigidity in the vicinity of the incorporating opening 26 can be increased.

Moreover, since the recess 32a is formed in the cover 32 and the cover is configured so that a portion of the output gear 24C enters the recess 32a, the overall strength of the cover 32 can be highly maintained while an increase in the size in the longitudinal direction (axial direction of the input shaft 18) of the speed reduction device G1 is avoided.

In addition, in the above-described embodiment, the hypoid pinion 20 (orthogonal pinion) is adopted as the input pinion. However, the gear speed reduction mechanism of the power transmission device according to the present invention includes the configuration of the input pinion, and particularly, the present invention is not limited to the configuration. That is, for example, the input pinion may be a spur pinion or a helical pinion. The gear speed reduction mechanism is not absolutely necessary to include the orthogonal speed reduction mechanism.

Moreover, in the above-described embodiment, the stiffened member 61 made of metal is disposed in the incorporating opening 26, the tubular portion 46 for connecting the splice casing 12 which is a motor connection member is formed in the input side of the casing body 30, the stiffened member 48 made of metal is disposed in the inner circumference of the tubular portion 46, and thus, the strength and the rigidity are further increased. However, the configurations are not absolutely necessary. On the other hand, the stiffened member is disposed in the periphery of the bearing disposition portion, and thus, the stiffening effect may be increased.

In addition, in the above-described embodiment, the incorporating opening 26 is formed in the shape which includes the portion 26a in which the opening height h1 is larger than the outer diameter d2 of the output gear 24C incorporated to the output shaft 22B in the gear 24 incorporated to the rotary shaft 22, and the portion 26b in which the opening height h2 is smaller than the outer diameter d2 so that the incorporating opening 26 has an approximately minimum opening area. However, this configuration is also not absolutely necessary.

Moreover, the recess 32a is formed in the cover 32 and a portion of the gear 24 (output gear 24C) enters the recess 32a. However, this configuration is not absolutely necessary, and for example, the cover 32 may be a simple flat plate.

It should be understood that the invention is not limited to the above-described embodiment, but may be modified into various forms on the basis of the spirit of the invention. Additionally, the modifications are included in the scope of the invention.

What is claimed is:

1. A power transmission device comprising:
    a gear speed reduction mechanism which includes an input shaft, an input pinion provided on the input shaft, a rotary shaft other than the input shaft, and a gear incorporated to the rotary shaft, wherein the gear is integral to the rotary shaft or is fixedly attached to the rotary shaft; and
    a casing which accommodates the gear speed reduction mechanism,
    wherein the casing is made of resin and includes a casing body which includes an incorporating opening for incorporating the gear and a cover which closes the incorporating opening,
    wherein the casing body includes an input side opening with the opening being a size that the input pinion can be inserted but the gear cannot be inserted, and
    wherein the rotary shaft is supported by a bearing which is supported by the casing body, and the bearing of the rotary shaft is not formed on the cover,
    wherein a recess is formed in an inner end side of the incorporating opening, and the cover also closes the recess,
    wherein a ring-like stiffened member made of metal is disposed in the recess,
    wherein the input side opening and the incorporating opening are provided on opposite surfaces of the casing body respectively,
    wherein a recess is formed in the cover, and a portion of the gear enters the recess, and
    wherein the ring-like stiffened member is in contact with the cover.

2. The power transmission device according to claim 1, wherein the input pinion is an orthogonal pinion, and
    wherein the bearing is formed on a surface which intersects a surface on which the input side opening is provided and a surface on which the incorporating opening is provided.

3. The power transmission device according to claim 1, further comprising:
    an input shaft bearing which supports the input shaft;
    a tubular portion for connecting a motor or motor connection member, the tubular portion being formed to be protruded on an input side surface on which the input side opening of the casing body is formed; and
    a second stiffened member made of metal which is separated from the input shaft bearing,
    wherein the input shaft bearing is not positioned inside of the tubular portion, and
    wherein the second stiffened member is positioned on a corner of an inner circumference of the tubular portion, the second stiffened member contacting with the input side surface.

4. The power transmission device according to claim 1, wherein when an opening height of an incorporating opening means is a size in a direction perpendicular to the axial direction of an output shaft of the incorporating opening,
    the incorporating opening includes a portion in which an opening height is larger than an outer diameter of an output gear which is incorporated to the output shaft of gears incorporated to the rotary shaft, and a portion in which an opening height is smaller than the outer diameter of the output gear.

5. The power transmission device according to claim 3, comprising a splice casing connected with the tubular portion, and
    wherein the input shaft bearing is positioned inside the splice casing.

6. The power transmission device according to claim 1, wherein in a cross-section which does not pass through an output gear and which is perpendicular to an output shaft, thicknesses of the casing body are constant from the incorporating opening toward the input side opening.

* * * * *